US008885281B2

(12) United States Patent
Chen

(10) Patent No.: US 8,885,281 B2
(45) Date of Patent: Nov. 11, 2014

(54) ELECTRICAL DEVICE HAVING A REDUCING HARDDISK VIBRATION FUNCTION AND REDUCING HARDDISK VIBRATION METHOD

(71) Applicant: Wistron Corp., New Taipei (TW)

(72) Inventor: Chieh-Hao Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/079,570

(22) Filed: Nov. 13, 2013

(65) Prior Publication Data

US 2014/0153129 A1 Jun. 5, 2014

(30) Foreign Application Priority Data

Dec. 4, 2012 (TW) .............................. 101145395 A

(51) Int. Cl.
*G11B 5/035* (2006.01)
*G11B 20/10* (2006.01)

(52) U.S. Cl.
CPC .... *G11B 20/10046* (2013.01); *G11B 20/10018* (2013.01)
USPC ............................................................ 360/65

(58) Field of Classification Search
None
See application file for complete search history.

(56) References Cited

U.S. PATENT DOCUMENTS

| 6,523,413 | B1 * | 2/2003 | Hoshino et al. | 73/660 |
|---|---|---|---|---|
| 2007/0133821 | A1 * | 6/2007 | Yamaguchi | 381/96 |
| 2009/0027846 | A1 | 1/2009 | Armendariz et al. | |
| 2009/0040742 | A1 * | 2/2009 | Tatsukami | 361/809 |
| 2009/0041289 | A1 * | 2/2009 | Watanabe et al. | 381/388 |
| 2009/0161887 | A1 * | 6/2009 | Yamaguchi | 381/98 |
| 2009/0256031 | A1 * | 10/2009 | Harita | 248/27.1 |
| 2009/0290252 | A1 * | 11/2009 | Fukase | 360/77.07 |
| 2011/0038247 | A1 * | 2/2011 | Lin et al. | 369/247.1 |
| 2013/0003982 | A1 * | 1/2013 | Lin et al. | 381/59 |

OTHER PUBLICATIONS

Taiwan Patent Office, Office Action, Patent Application Serial No. 101145395, Jul. 1, 2014, Taiwan.

* cited by examiner

*Primary Examiner* — Peter Vincent Agustin

(57) ABSTRACT

The present application discloses a method to reduce hard-disk vibrations. The method to reduce hard-disk vibrations is for an electrical device having a hard-disk and a speaker, and the method to reduce hard-disk vibrations includes: determining a vibration value of the hard-disk when the speaker outputs an audio signal; determining whether the vibration value exceeds a predetermined vibration value; when the vibration value exceeds the predetermined vibration value, adjusting the audio signal into an adjusted audio signal via a reducing vibration equalizer; and outputting the adjusted audio signal by the speaker, wherein an amplitude of a predetermined frequency of the adjusted audio signal is smaller than an amplitude of the predetermined frequency of the audio signal.

8 Claims, 3 Drawing Sheets

ELECTRICAL DEVICE HAVING A REDUCING HARDDISK VIBRATION FUNCTION AND REDUCING HARDDISK VIBRATION METHOD

CROSS REFERENCE TO RELATED APPLICATIONS

This Application claims priority of Taiwan Patent Application No. 101145395, filed on Dec. 4, 2012, the entirety of which is incorporated by reference herein.

BACKGROUND OF THE INVENTION

1. Field of the Invention

The disclosure relates generally to method to reduce hard-disk vibrations, and more particularly, method to reduce hard-disk vibrations for an electrical device with a speaker and a hard-disk.

2. Description of the Related Art

Nowadays, regarding to the decrease of the data transmission rate of a hard-disk caused by external vibrations, the vibration of the hard-disk is reduced generally by setting shockproof glues, or protective sleeves, or attaching sponges to hardware. However, the use of these materials increases manufacturing costs.

In addition, electronic devices such as notebooks usually have a speaker to allow users to listen to music. However, data transmission rate of the hard-disk decreases due to the vibrations of the speakers while playing audio signals.

BRIEF SUMMARY OF THE INVENTION

During data read or data write, the data transmission rate of hard-disk may be changed by external vibration, so that the vibration generated by the speakers outputting an audio signal also affects the data transmission rate of the hard-disk. However, not all audio signals have a serious impact on the data transmission rate of the hard-disk. In general, the data transmission rate of hard-disk decreases due to some specific frequencies of the sound signal. Also, with the specifications of hard-disks being different, the specific frequencies may be different.

In order to solve the problems, an embodiment of the invention discloses a method to reduce hard-disk vibrations for an electrical device having a hard-disk and a speaker. The method to reduce hard-disk vibrations comprises: determining a vibration value of the hard-disk when the speaker outputs an audio signal; determining whether the vibration value exceeds a predetermined vibration value; when the vibration value exceeds the predetermined vibration value, adjusting the audio signal into an adjusted audio signal via a reducing vibration equalizer; and outputting the adjusted audio signal by the speaker, wherein an amplitude of a predetermined frequency of the adjusted audio signal is smaller than an amplitude of the predetermined frequency of the audio signal.

An embodiment of the invention discloses an electrical device having a reducing hard-disk vibration function, comprising: a hard-disk, having a data transmission rate; a speaker, configured to output an audio signal and an adjusted audio signal; a sensor, detecting a vibration value of the hard-disk; a control unit, determining whether the vibration value exceeds a predetermined vibration value when the speaker outputs the audio signal, and generating a reducing vibration signal when the vibration value exceeds the predetermined vibration value; and an audio codec unit, adjusting the audio signal into the adjusted audio signal via a reducing vibration equalizer when receiving the reducing vibration signal, wherein an amplitude of a predetermined frequency of the adjusted audio signal is smaller than an amplitude of the predetermined frequency of the audio signal.

BRIEF DESCRIPTION OF DRAWINGS

The invention will become more fully understood by referring to the following detailed description with reference to the accompanying drawings, wherein.

DETAILED DESCRIPTION OF THE INVENTION

The making and using of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Figure 1:
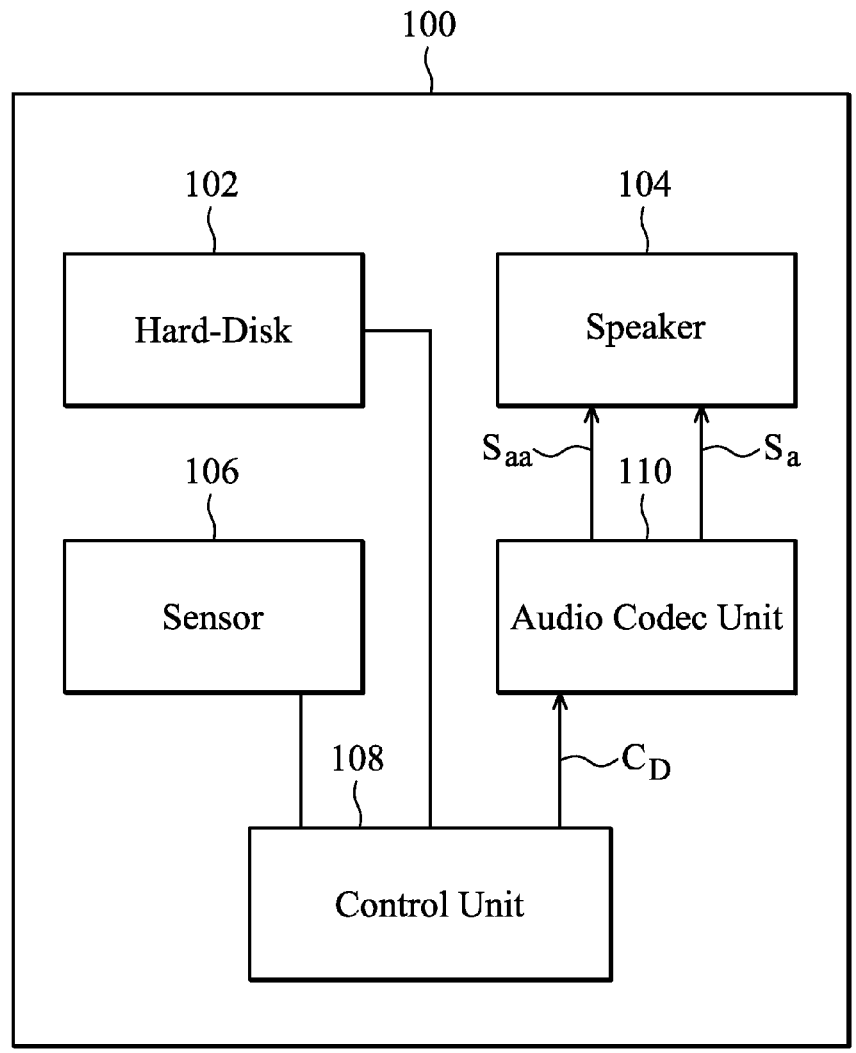
FIG. 1 is a schematic diagram illustrating an embodiment of an electrical device having a reducing hard-disk vibration function.

FIG. 1 is a schematic diagram illustrating an embodiment of an electrical device having a reducing hard-disk vibration function. The electrical device 100 may be a notebook or any computer device with a hard-disk and a speaker. In an embodiment, the electrical device 100 comprises a hard-disk 102, a speaker 104, a sensor 106, a control unit 108 and an audio codec unit 110. The hard-disk 102 is configured to store data of the electrical device 100. The speaker 104 is configured to output an audio signal Sa, and the audio signal Sa is provided by the audio codec (coder-decoder) unit 110. The sensor 106 may be a gravity sensor (G sensor), a motion sensor, or an acceleration sensor. The sensor 106 is normally arranged around the hard-disk 102 and configured to detect the vibration or acceleration value of the hard-disk 102 or the electrical device 100. When the speaker 104 outputs the audio signal Sa, the control unit 108 determines whether the obtained vibration value exceeds a predetermined vibration value, and generates a reducing vibration signal $C_D$ to the audio codec unit 110 when the vibration value exceeds the predetermined vibration value. Note that the control unit can be performed by an embedded controller. The predetermined vibration value can be set according to user design, and will be described later. The audio codec unit 110 is configured to code/decode audio data to generate the audio signal Sa, and the audio data can be obtained from the memory in the electrical device 100 or from an external storage device. On the other hand, the audio codec unit 110 can further adjust the audio signal Sa by an equalizer. For example, an equalizer can enhance or decay amplitude (Volume) in some frequencies of the audio signal Sa, so that the effects of voice enhancing, such as median or bass enhancement or vocal enhancement, can be accomplished.

In order to solve the problems above, in some embodiments, when the audio codec unit 110 receives the reducing vibration signal $C_D$, the audio codec unit 110 adjusts the audio signal Sa into an adjusted audio signal Saa. The amplitude of the predetermined frequency of the adjusted audio signal Saa is smaller than the amplitude of the predetermined frequency of the original audio signal Sa, and the predetermined frequency is the specific frequency causing the decrease of the data transmission rate of the hard-disk 102. Due to the audio frequency causing the decrease of the data transmission rate of the hard-disk 102 being decayed by the reducing vibration equalizer, the data transmission rate of the hard-disk 102 can be improved when the speaker 104 changes to output the adjusted audio signal Saa. The reducing vibration equalizer can be a set of parameter settings, and the audio codec unit 110 uses the set of parameter settings to perform the adjustment of the audio signal Sa. Also, the reducing vibration equalizer can be set according to user design, and will be described later.

Figure 2:
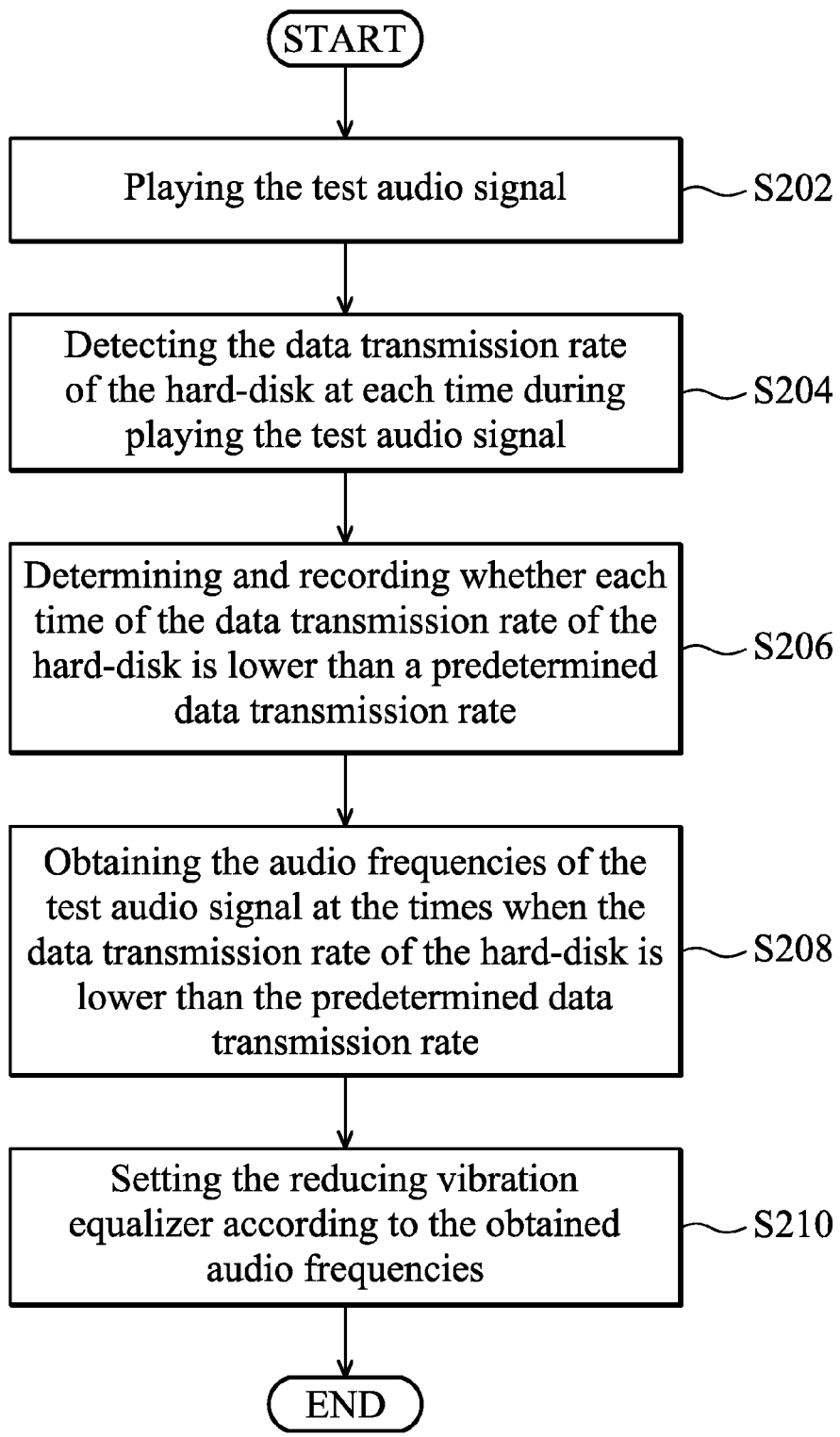
FIG. 2 is a flowchart illustrating an embodiment of a method of obtaining the reducing vibration equalizer.

An embodiment of the reducing vibration equalizer of the invention is illustrated according to FIG. 2 herein, and FIG. 2 is a flowchart illustrating an embodiment of a method of obtaining the reducing vibration equalizer. In step S202, the speaker 104 plays a test audio signal, and the test audio signal can be generated by the audio codec unit 110 coding/decoding any audio data. It should be noted that, in order to increase efficiency of the reducing vibration equalizer, the test audio signal may include many frequencies.

Next, in the step S204, the data transmission rate of the hard-disk 102 is detected during that the speaker 104 plays the test audio signal, and the data transmission rate of the hard-disk 102 is recorded simultaneously.

In step S206, whether each time of the data transmission rate of the hard-disk 102 is lower than a predetermined data transmission rate (for example, 10 MegaBytes/sec) is determined, and the times when the data transmission rate of the hard-disk 102 is lower than the predetermined data transmission rate are recorded. It should be noted that, the predetermined data transmission rate can be set according to user design. For example, the predetermined data transmission rate can be set to be higher if the user wants to get a higher data transmission rate of the hard-disk 102.

In step S208, the audio frequencies of the test audio signal at the recorded times when the data transmission rate of the hard-disk 102 is lower than the predetermined data transmission rate are obtained, and the audio frequencies are set as the predetermined frequencies.

In the last step S210, the reducing vibration equalizer is set according to predetermined frequencies, and the reducing vibration equalizer is configured to decay the predetermined frequencies. Therefore, after the audio signal Sa is adjusted into the adjusted audio signal Saa by the reducing vibration equalizer, the amplitude of the predetermined frequencies (the predetermined frequencies obtained in step S208) of the adjusted audio signal Saa is smaller than the amplitude of the predetermined frequencies of the audio signal Sa.

In addition, in an embodiment, the vibration values detected by the sensor 106 at each time can be further recorded in step S204. Next, in step S208, according to vibration values recorded at each time when the data transmission rate of the hard-disk 102 is lower than the predetermined data transmission rate, the predetermined vibration value can be determined for maintaining the appropriate transmission rate on hard-disk 102. For example, the predetermined vibration value can be obtained according to the record of the vibration values at the times when the data transmission rate of the hard-disk 102 is lower than the predetermined data transmission rate. In an embodiment, if the sensor 106 is a gravity sensor and the record of the gravity accelerations at the times when the data transmission rate of the hard-disk 102 is lower than the predetermined data transmission rate are 0.5 G, 0.6 G, 0.4 G, 0.5 G and 0.6 G respectively, the vibration value can be set as 0.4 to avoid decreasing of the data transmission rate. It should be noted that, the predetermined vibration value can be set as an average of the vibration values at the times when the data transmission rate of the hard-disk 102 is lower than the predetermined data transmission rate, or set as higher than the average, depending upon user requirements.

Figure 3:
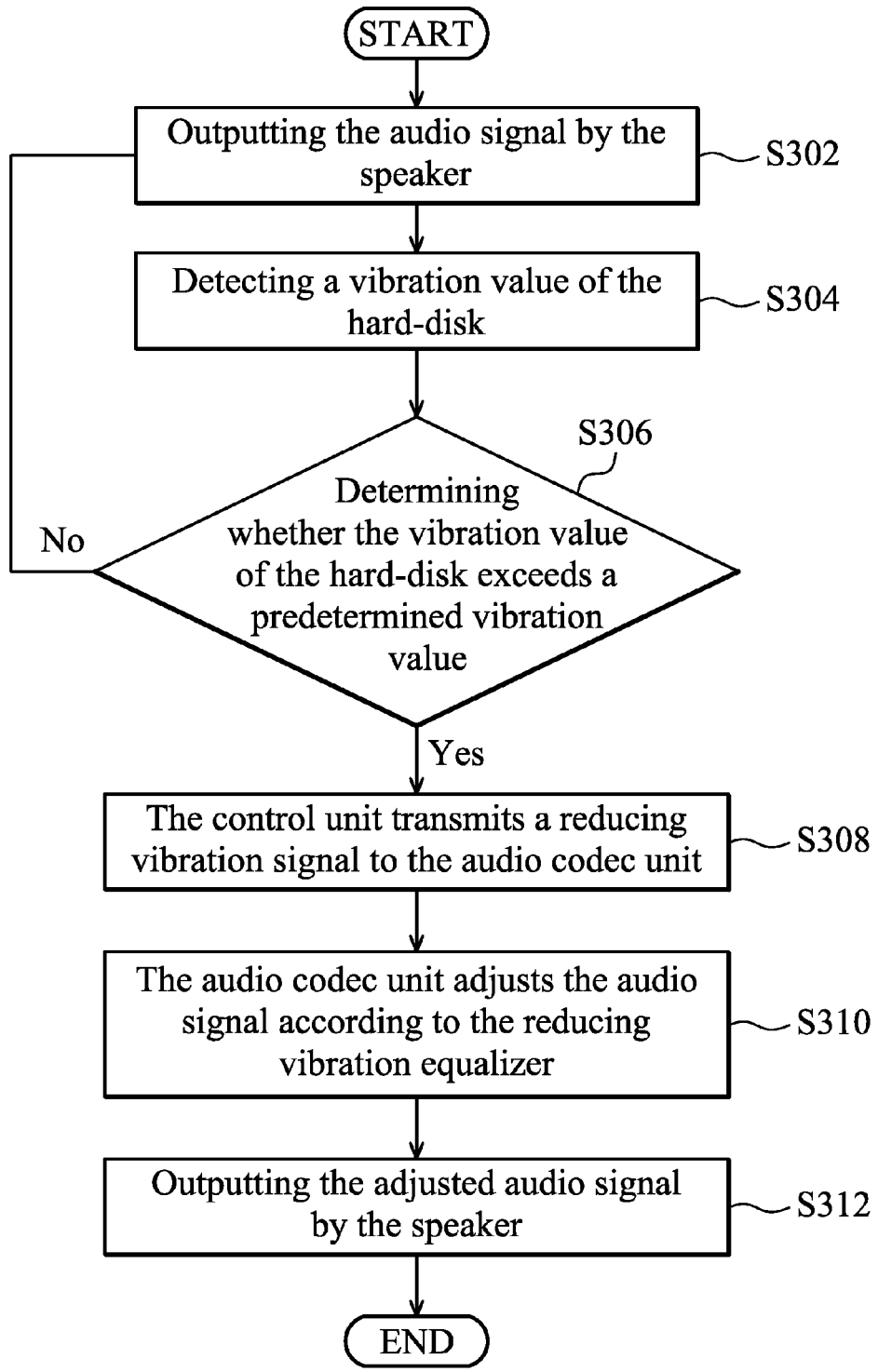
FIG. 3 is a flowchart of an embodiment of a method to reduce hard-disk vibrations for the electrical device shown in FIG. 1.

FIG. 3 is a flowchart of an embodiment of a method to reduce hard-disk vibrations for the electrical device shown in FIG. 1. In the step S302, the audio codec unit 110 codes/decodes audio data to generate the audio signal Sa, and the speaker 104 outputs the audio signal Sa.

Next, in step S304, the sensor 106 detects a vibration value of the hard-disk 102. In step 306, the control unit 110 determines whether the vibration value of the hard-disk 102 exceeds a predetermined vibration value. When the vibration value exceeds the predetermined vibration value, the operation proceeds to step S308. When the vibration value does not exceed the predetermined vibration value, the operation backs to step S302, and the speaker 104 outputs the audio signal Sa according to original setting.

In step S308, the control unit 108 transmits a reducing vibration signal $C_D$ to the audio codec unit 110. Next, in step S310, the audio codec unit adjusts the audio signal Sa into the adjusted audio signal Saa according to the reducing vibration equalizer.

In the last step S312, the speaker 104 outputs the adjusted audio signal Saa. It should be noted that, the amplitude of the predetermined frequency of the adjusted audio signal Saa is smaller than the amplitude of the predetermined frequency of the original audio signal Sa. Due to the audio frequency causing the decreasing of the data transmission rate of the hard-disk 102 to decay by the reducing vibration equalizer, the data transmission rate of the hard-disk 102 can be improved when the speaker 104 changes to output the adjusted audio signal Saa. Furthermore, the invention can be performed in a common computer with the presented electrical elements. For example, the control unit 108 can be performed by an embedded controller. Therefore, the data transmission rate of the hard-disk can be improved without adding any hardware.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method to reduce hard-disk vibrations for an electrical device having a hard-disk and a speaker, comprising:
   determining a vibration value of the hard-disk when the speaker outputs an audio signal;
   determining whether the vibration value exceeds a predetermined vibration value;
   when the vibration value exceeds the predetermined vibration value, adjusting the audio signal into an adjusted audio signal via a reducing vibration equalizer; and
   outputting the adjusted audio signal by the speaker,
   wherein an amplitude of a predetermined frequency of the adjusted audio signal is smaller than an amplitude of the predetermined frequency of the audio signal;
   wherein the predetermined frequency is an audio frequency outputted by the speaker when a data transmission rate of the hard-disk is lower than a predetermined data transmission rate.

2. The method to reduce hard-disk vibrations of claim 1, further comprising:

when the vibration value does not exceed the predetermined vibration value, outputting the audio signal by the speaker.

3. The method to reduce hard-disk vibrations of claim 1, further comprising:
outputting a test signal by the speaker during a test period;
detecting a data transmission rate of the hard-disk at each time during the test period;
determining a frequency of the test signal at the time when the data transmission rate of the hard-disk is lower than a predetermined data transmission rate; and
setting the reducing vibration equalizer according to the frequency.

4. The method to reduce hard-disk vibrations of claim 3, further comprising:
obtaining a test vibration value of the hard-disk at each time during the test period;
determining the test vibration value corresponding to the time when the data transmission rate of the hard-disk is lower than a predetermined data transmission rate; and
obtaining the predetermined vibration value according to the test vibration value.

5. The method to reduce hard-disk vibrations of claim 3, wherein the predetermined data transmission rate is 10 Mega-Bytes/sec.

6. An electrical device having a reducing hard-disk vibration function, comprising:
a hard-disk, having a data transmission rate;
a speaker, configured to output an audio signal and an adjusted audio signal;
a sensor, detecting a vibration value of the hard-disk;
a control unit, determining whether the vibration value exceeds a predetermined vibration value when the speaker outputs the audio signal, and generating a reducing vibration signal when the vibration value exceeds the predetermined vibration value; and
an audio codec unit, adjusting the audio signal into the adjusted audio signal via a reducing vibration equalizer when receiving the reducing vibration signal,
wherein an amplitude of a predetermined frequency of the adjusted audio signal is smaller than an amplitude of the predetermined frequency of the audio signal;
wherein the predetermined frequency is an audio frequency outputted by the speaker when a data transmission rate of the hard-disk is lower than a predetermined data transmission rate.

7. The electrical device of claim 6, wherein when the vibration value does not exceed the predetermined vibration value, the speaker continuously outputs the audio signal.

8. The electrical device of claim 6, wherein the control unit is an embedded controller.

* * * * *